(12) United States Patent
Schmidt et al.

(10) Patent No.: US 7,457,773 B2
(45) Date of Patent: Nov. 25, 2008

(54) METHOD AND SYSTEM FOR GENERATING A CALENDAR WITH A VARIABLE DEFINITION OF DAYS

(75) Inventors: Diane Simona Bettina Schmidt, Walldorf (DE); Markus Lippe, Wuerenlos (CH)

(73) Assignee: SAP AG, Walldorf (DE)

( * ) Notice: Subject to any disclaimer, the term of this patent is extended or adjusted under 35 U.S.C. 154(b) by 847 days.

(21) Appl. No.: 10/740,846

(22) Filed: Dec. 22, 2003

(65) Prior Publication Data

US 2006/0175392 A1   Aug. 10, 2006

Related U.S. Application Data

(60) Provisional application No. 60/506,768, filed on Sep. 30, 2003.

(51) Int. Cl.
*G06Q 40/00* (2006.01)

(52) U.S. Cl. .......................................... 705/35; 705/30
(58) Field of Classification Search .................. 705/30, 705/35; 235/377
See application file for complete search history.

(56) References Cited

U.S. PATENT DOCUMENTS

| | | | | |
|---|---|---|---|---|
| 6,044,219 | A | * | 3/2000 | Lips ........................... 717/106 |
| 7,117,172 | B1 | * | 10/2006 | Black ........................... 705/35 |
| 2003/0120566 | A1 | * | 6/2003 | Lipschutz et al. ............. 705/30 |

* cited by examiner

*Primary Examiner*—Jagdish N Patel
*Assistant Examiner*—Kenneth L Bartley
(74) *Attorney, Agent, or Firm*—Kenyon & Kenyon LLP (57) ABSTRACT

Embodiments of the present invention relate to a method and system for generating a calendar comprising a variable definition of days. The variable definition of days may correspond to an assignment of varying combinations of interest day types to days represented by the calendar. The interest day types may affect how interest is calculated on a corresponding day.

10 Claims, 9 Drawing Sheets

| FIELD NAME | KEY | TYPE | LENGTH | DESCRIPTION |
|---|---|---|---|---|
| MANDT | X | CLNT | 3 | CLIENT |
| ICALID | X | CHAR | 2 | INTEREST CALENDAR ID |
| ICALRNUM | X | NUMC | 4 | RULE NUMBER (COUNTER) FOR INTEREST CALENDAR |
| LTEXT | | CHAR | 60 | OBJECT TEXT |
| JAHRVON | | NUMC | 4 | INTEREST CALENDAR RULE VALID FROM (YEAR) |
| JAHRBIS | | NUMC | 4 | INTEREST CALENDAR RULE VALID TO (YEAR) |
| ICALRULE | | NUMC | 2 | INTEREST CALENDAR RULE TYPE |
| DAYOFWEEK | | NUMC | 1 | DAY OF WEEK |
| DAYOFMONTH | | NUMC | 2 | DAY OF MONTH |
| HOCID | | CHAR | 2 | PUBLIC HOLIDAY CALENDAR |
| THOCT_LTEXT | | CHAR | 60 | OBJECT TEXT |
| DATUMVON | | DATS | 8 | DATE FROM |
| DATUMBIS | | DATS | 8 | DATE TO |
| ICALSHIFTDAY | | CHAR | 3 | INTEREST CALENDAR DAILY SHIFT |
| ICALSHIFTDHF | | CHAR | 2 | INTEREST CALENDAR WORKING DAY/ PUBLIC HOLIDAY SHIFT |
| WFCID | | CHAR | 2 | FACTORY CALENDAR |
| TFACT_LTEXT | | CHAR | 60 | OBJECT TEXT |
| INTDAYTYPE | | CHAR | 1 | INTEREST DAY TYPE |
| INTDAYTYPE_T | | CHAR | 30 | DESCRIPTION OF INTEREST DAY TYPE |
| CRUSER | | CHAR | 12 | NAME OF CALENDAR CREATOR OR MODIFIER |
| CRDAT | | DATS | 8 | DATE |
| CRTIME | | TIMS | 6 | TIME OF CALENDAR CREATION OR MODIFICATION |

FIG.3C

| FIELD NAME | KEY | TYPE | LENGTH | DESCRIPTION |
|---|---|---|---|---|
| MANDT | X | CLNT | 3 | CLIENT |
| ICALID | X | CHAR | 2 | INTEREST CALENDAR ID |
| JAHR | X | NUMC | 4 | YEAR SAVED |
| MON01 | | CHAR | 31 | CALENDAR: DAYS OF THE MONTH OF JANUARY |
| MON02 | | CHAR | 31 | CALENDAR: DAYS OF THE MONTH OF FEBRUARY |
| MON03 | | CHAR | 31 | CALENDAR: DAYS OF THE MONTH MARCH |
| MON04 | | CHAR | 31 | CALENDAR: DAYS OF THE MONTH APRIL |
| MON05 | | CHAR | 31 | CALENDAR: DAYS OF THE MONTH MAY |
| MON06 | | CHAR | 31 | CALENDAR: DAYS OF THE MONTH JUNE |
| MON07 | | CHAR | 31 | CALENDAR: DAYS OF THE MONTH JULY |
| MON08 | | CHAR | 31 | CALENDAR: DAYS OF THE MONTH AUGUST |
| MON09 | | CHAR | 31 | CALENDAR: DAYS OF THE MONTH SEPTEMBER |
| MON10 | | CHAR | 31 | CALENDAR: DAYS OF THE MONTH OCTOBER |
| MON11 | | CHAR | 31 | CALENDAR: DAYS OF THE MONTH NOVEMBER |
| MON12 | | CHAR | 31 | CALENDAR: DAYS OF THE MONTH DECEMBER |
| FENUM | | NUMC | 3 | NUMBER OF DAYS IN A YEAR |
| ICGENSTA | | CHAR | 1 | INTEREST CALENDAR GENERATION STATUS |
| CRUSR | | CHAR | 12 | NAME OF INTEREST CALENDAR GENERATION CREATOR OR MODIFIER |
| CRDAT | | DATS | 8 | DATE OF INTEREST CALENDAR GENERATION CREATION OR MODIFICATION |
| CRTIME | | TIMS | 6 | TIME OF INTEREST CALENDAR GENERATION CREATION OR MODIFICATION |

METHOD AND SYSTEM FOR GENERATING A CALENDAR WITH A VARIABLE DEFINITION OF DAYS

CROSS-REFERENCE TO RELATED APPLICATIONS

This application claims the benefit of U.S. provisional application Ser. No. 60/506,768, filed Sep. 30, 2003.

FIELD OF THE INVENTION

Embodiments of the present invention relate to computers and computer software, and more specifically to a computer-implemented method and system for generating a calendar with a variable definition of days.

BACKGROUND INFORMATION

Developments in the business world have led to an increasing demand for greater precision in the calculation of interest. For example, parties whose business dealings involve using bank services can agree with the banks that particular conditions will call for particular corresponding interest rates to apply to sums deposited in or borrowed from the banks. The conditions might depend on such factors as the calendar day: that is, on whether it is a workday or weekend day, a public holiday, the last workday of the month, a public holiday in a country that has a strong influence on financial markets (e.g., July 4), and the like. Users of bank services also may agree to let events in financial markets affect the way interest is calculated on a given calendar day. An example of such an event is an "option expiration," which may occur at regular intervals in a stock exchange. For example, on the third Friday of the third month of each quarter, index futures and options on the Eurex options and futures exchange on the German Stock Exchange (DAX) expire. Typically, on an option expiration day, large market participants, such as fund managers, try to force options and futures prices to the level equivalent to their investment on the options and futures market.

Known business software typically may only allow a user to discriminate with respect to working days and non-working days (i.e., typically, week days vs. weekends and public holidays), for whatever purposes this distinction might be relevant. However, discrimination with respect to calendar days with only this coarse degree of variability is not able to adequately reflect the increasing variability in the way the calendar may affect an interest calculation. Accordingly, in view of the greater demand for more precision in interest calculation, an approach is called for to reflect such variability.

SUMMARY OF THE INVENTION

Embodiments of the present invention relate to a method and system for generating a calendar comprising a variable definition of days. More specifically, a plurality of different day types may be assigned to calendar days, where the number of the plurality is arbitrary and, in particular, greater than two. Because the number of different day types assignable to a calendar day is arbitrary, many different day types can be used as data points or indicators for discriminating between calendar days. According to embodiments, the day types may relate to an interest rate to be applied on a corresponding day. The ability, according to the present invention, to discriminate in many ways between calendar days based on day type may provide a convenient way to link a given calendar day to a corresponding effective interest rate for purposes of an interest calculation. This, in turn, may facilitate greater precision in interest calculation when it depends on the calendar day.

DETAILED DESCRIPTION

Figure 1A:
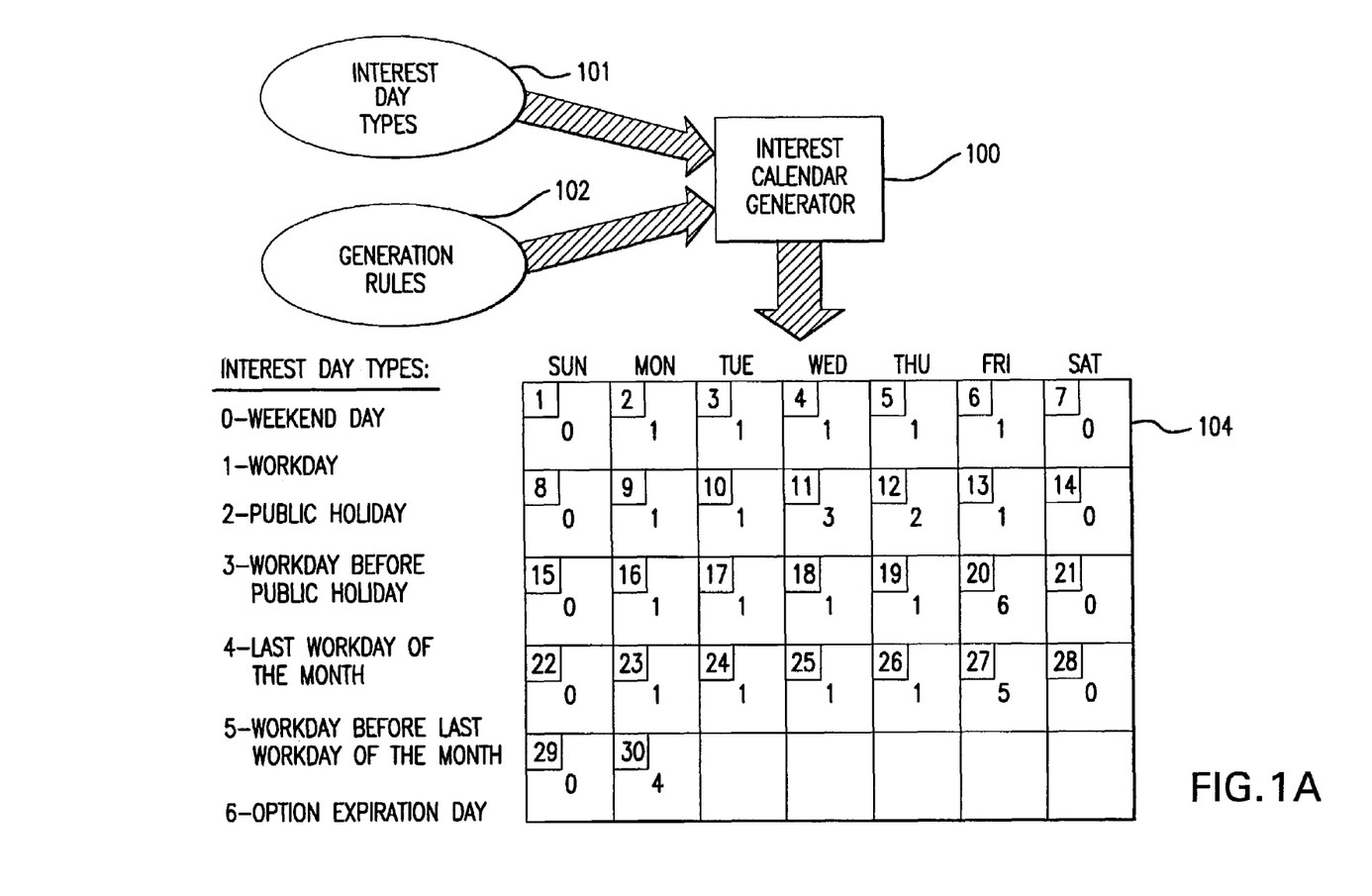
FIG. 1A shows elements relating to generating an interest calendar according to embodiments of the present invention.

FIG. 1A shows elements of the present invention according to embodiments. The embodiments may comprise an interest calendar generator 100, which may be implemented in computer-executable instructions. The interest calendar generator 100 may receive as input a plurality of interest day types 101. Any arbitrary classification of calendar days into varying interest day types may be possible according to embodiments. By way of example only, as further shown in FIG. 1A, classes of interest day types may include weekend days, workdays, public holidays, workdays before public holidays, the last workday of a month, the workday before the last workday of a month, and an option expiration day. Each day type may have an associated code number: in this example, 0, 1, 2, 3, 4, 5 and 6, respectively.

The workday before the last workday of the month and the last workday of the month are examples of events that typically trigger some sort of periodic balancing and/or reporting activity, and that may trigger payments, since payment deadlines often occur on these days. As noted earlier, an option expiration day is an example of a periodic financial market event that typically triggers increased activity in financial markets.

The interest calendar generator 100 may further receive as input a specification of a generation rule or rules 102. The generation rules 102 may correspond to various combinations of interest day types that are to be assigned to a particular span of time represented by a particular interest day calendar. More specifically, in response to receiving, as input, the specification of a given generation rule or rules, the interest calendar generator 100 may generate a corresponding interest calendar 104 comprising a plurality of assignments or allocations of varying interest day types to days represented by the calendar. Interest calendar 104 represents data, which could be stored digitally on some form of machine-readable medium such as disk or memory, corresponding to one possible example of an assignment of interest day types to an arbitrary month in accordance with a specified generation rule or rules. Though interest calendar 104 covers an exemplary period of only one month, an interest calendar may more generally cover longer periods, such as a year or more.

In the example of FIG. 1A, interest day type code "0" has been assigned to most weekend days, and interest day type code "1" has been assigned to most of the workdays. Simply for purposes of illustration, day 12 of the month has been designated to be a public holiday, and accordingly is assigned the interest day type code 2; therefore, day 11 is assigned the interest day type code 3. Again, simply for illustration, it is assumed that the month is the third month of the quarter; thus, interest day type code 6, representing the financial event of an option expiration day, has been assigned to the third Friday of this month (day 20). Days 27 and 30 have been assigned the interest day type codes 5 and 4, corresponding to the day before the last workday of the month, and the last workday of the month, respectively.

Figure 1B:
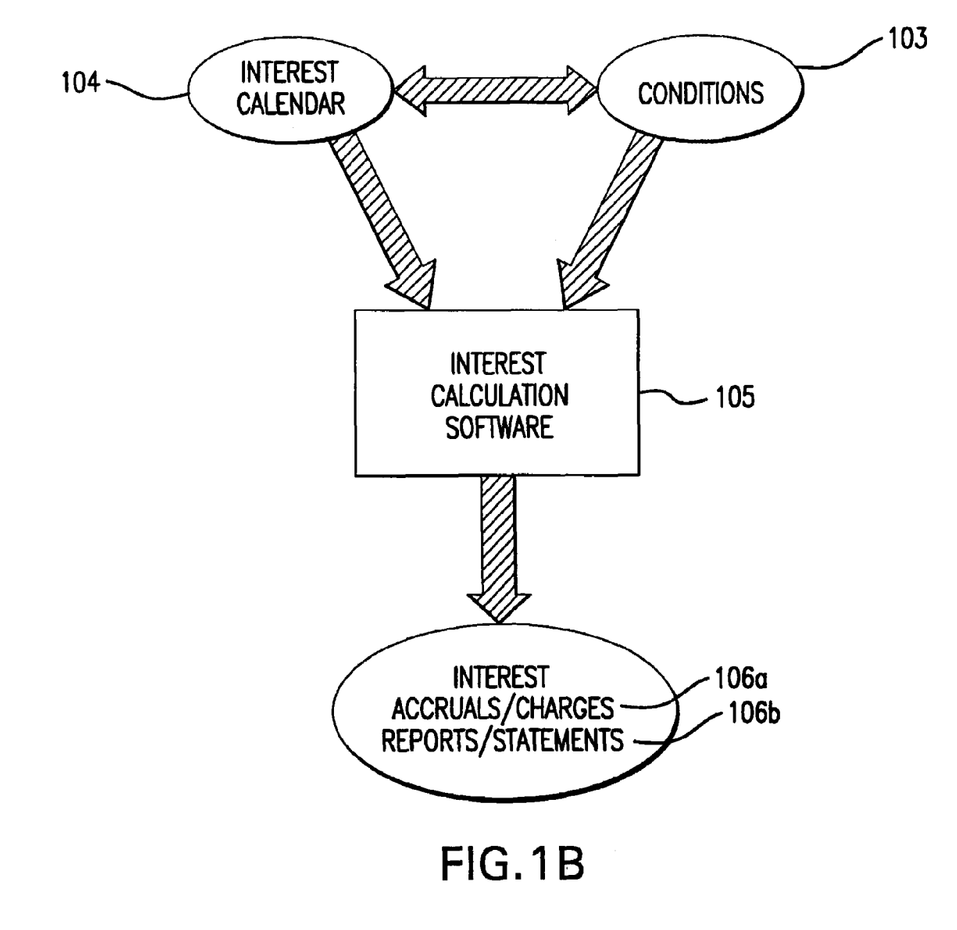
FIG. 1B shows an example of interest calculation using an interest calendar according to embodiments of the invention.

An interest calendar 104 may be associated or linked with conditions 103, as shown in FIG. 1B. The conditions 103 may determine what interest rate or rates apply on a given calendar day. The conditions 103 may be stored digitally on some form of machine-readable medium such as disk or memory. Banking software, for instance, interest calculation software 105, may receive, as input, data from an interest calendar 104 and associated conditions 103, to perform interest calculations. Such interest calculations might be performed, for example, pursuant to periodic "settlement" activities for bank accounts, during which interest and fees are calculated and reported to account holders. More specifically, to perform interest calculations, the interest calculation software 105 may refer to a specific interest calendar 104 to determine the day type for the day for which the interest is being calculated. Via the association with the conditions 103, the applicable interest rate for that day type may be determined, and a corresponding interest calculation performed. As a result of operations by the intraday interest calculation software 105, an interest accrual or interest charge 106a may be credited/debited to the account, and a statement or report 106b on interest accruals/charges may be produced.

Figure 2:
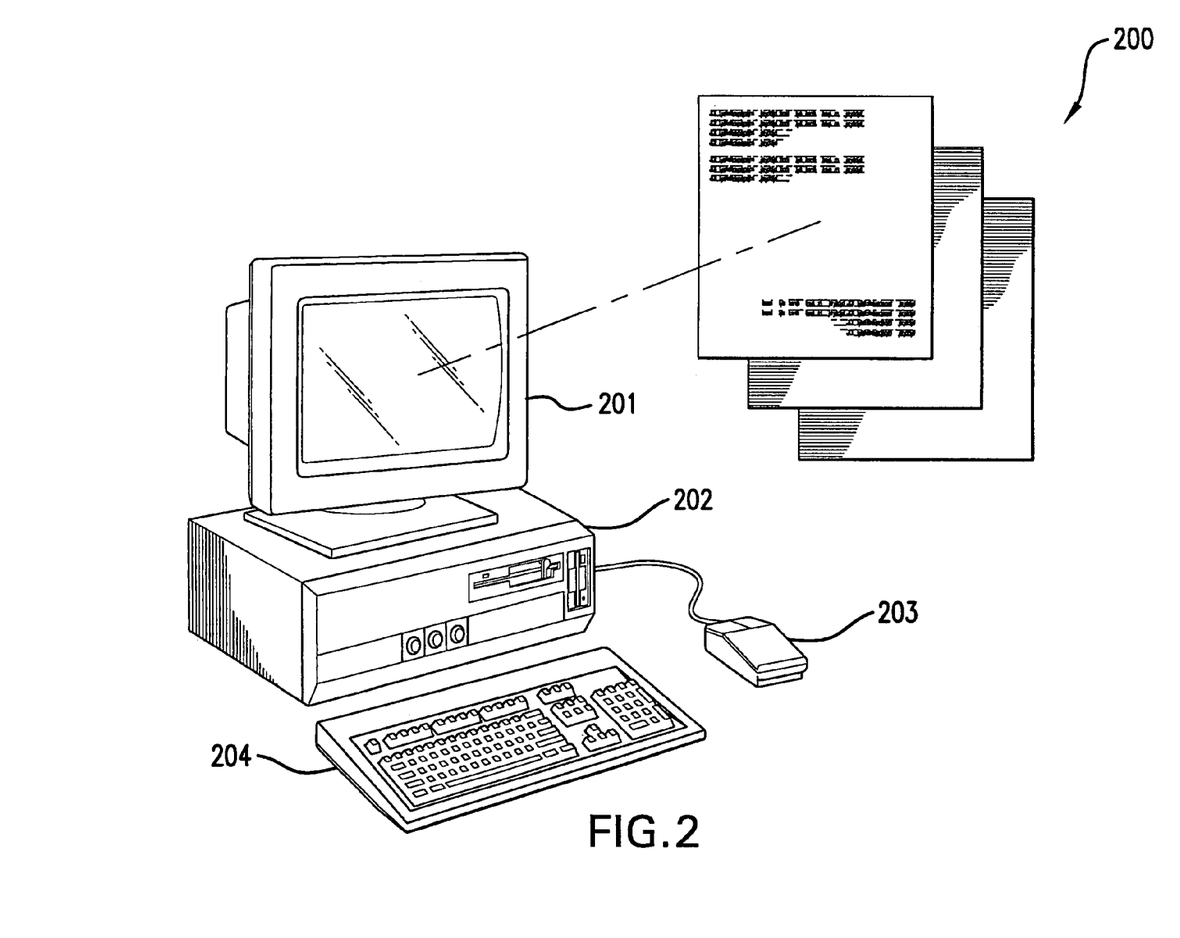
FIG. 2 shows a user interface according to embodiments of the invention.

Referring to FIG. 2, embodiments of the invention may further comprise a user interface for receiving input relating to interest day types and generation rules. The user interface may be implemented by software that produces a plurality of displays 200 on a display device 201, such as a computer monitor coupled to a computer 202, where the display is adapted to receive user input by way of an input device such as a mouse 203 or a keyboard 204. In particular, for example, a display of the user interface may comprise a plurality of fields in which data entered by a user may be entered and displayed. Data entered into the fields could be stored in a database on some form of computer-readable medium such as disk or memory, for access and retrieval when needed, for example, to perform a particular operation relating to an interest calendar. The fields may have corresponding field names representing variables to which values entered by a user may be assigned and acted on by computer-executable instructions according to embodiments of the present invention. Values of the fields may, for example, be read from and written to data structures such as tables stored in a database.

FIGS. 3A-3E show examples of tables organized in terms of field names and associated information. The tables represent corresponding data structures stored in a machine-readable medium such as memory or disk. Information may be read from the tables, displayed in the interface, added to or modified by a user, acted on by computer-executable instructions according to embodiments of the invention, and written back to the medium. It should be understood that the tables, field names and associated information shown in FIGS. 3A-3E are merely representative of functionality which could be implemented in any of a variety of programming structures and methods and do not limit the embodiments of the invention to the examples shown.

Figure 3A:
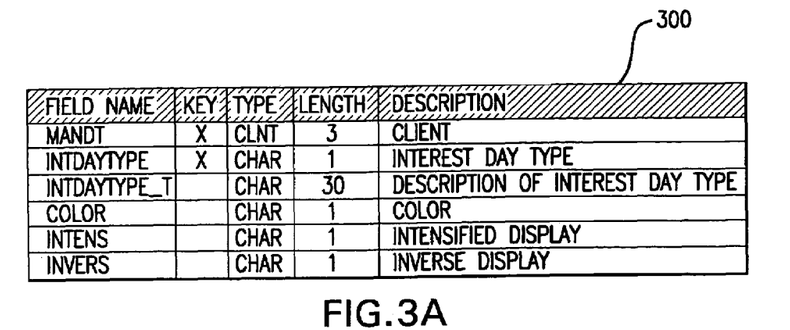
FIG. 3A-3E show a number of tables according to embodiments of the invention.

FIG. 3A shows one possible configuration of a table 300 for definition of interest day types. In table 300, field names such as INTDAYTYPE and INTDAYTYPE_T should be understood to represent fields in a display of the user interface that can be used to display, define or modify a corresponding value in the table. The values defined and/or modified in the user interface display may subsequently be stored in data structures corresponding to the table, and retrieved, modified and stored again as desired. The INTDAYTYPE field, more specifically, may be used to define an interest day type, such as workday, public holiday and so on as discussed above. A particular interest day type may set a constant interest rate for the duration of the corresponding day. The interest day type may, as in the example discussed above, be defined in terms of a one-digit numerical code. Alternatively, it could be an alphabetical code (e.g., A, B, C, . . . ), an alphanumeric code, or any other suitable way of designating interest day type. The COLOR, INTENS and INVERS fields may allow a user to control features of the appearance of a display on the screen of a display device.

Figure 3B:
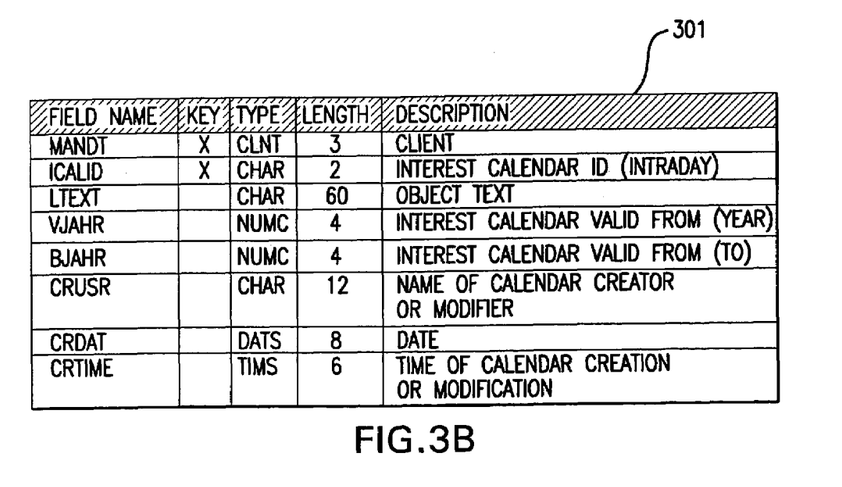

FIG. 3B shows a table 301 according to embodiments of the present invention. The ICALID field in table 301 may be used to specify or set an interest calendar identifier. More specifically, ICALID may correspond to a particular instantiation of an interest calendar 104. Embodiments of the present invention may support the instantiation of multiple different interest calendars, each with its own distinct identifier. It may be possible to associate a particular instantiation of an interest calendar with a particular set of conditions 103, where the conditions may be grouped or classified according to "condition group type" (discussed later). A condition group type may represent a set of conditions relating to particular customers or accounts. For example, a given condition group type could be a set of conditions relating to types of products offered by a bank, such as checking accounts for customers under 18, or accounts for "triple-A rated companies," or the like.

Fields VJAHR and BJAHR in table 301 may provide for specifying a range of time that a particular interest calendar is valid or in effect. For example, fields VJAHR and BJAHR may, respectively, provide for the specification of a "from" year and an "until" year that the calendar is in effect.

Figure 3C:
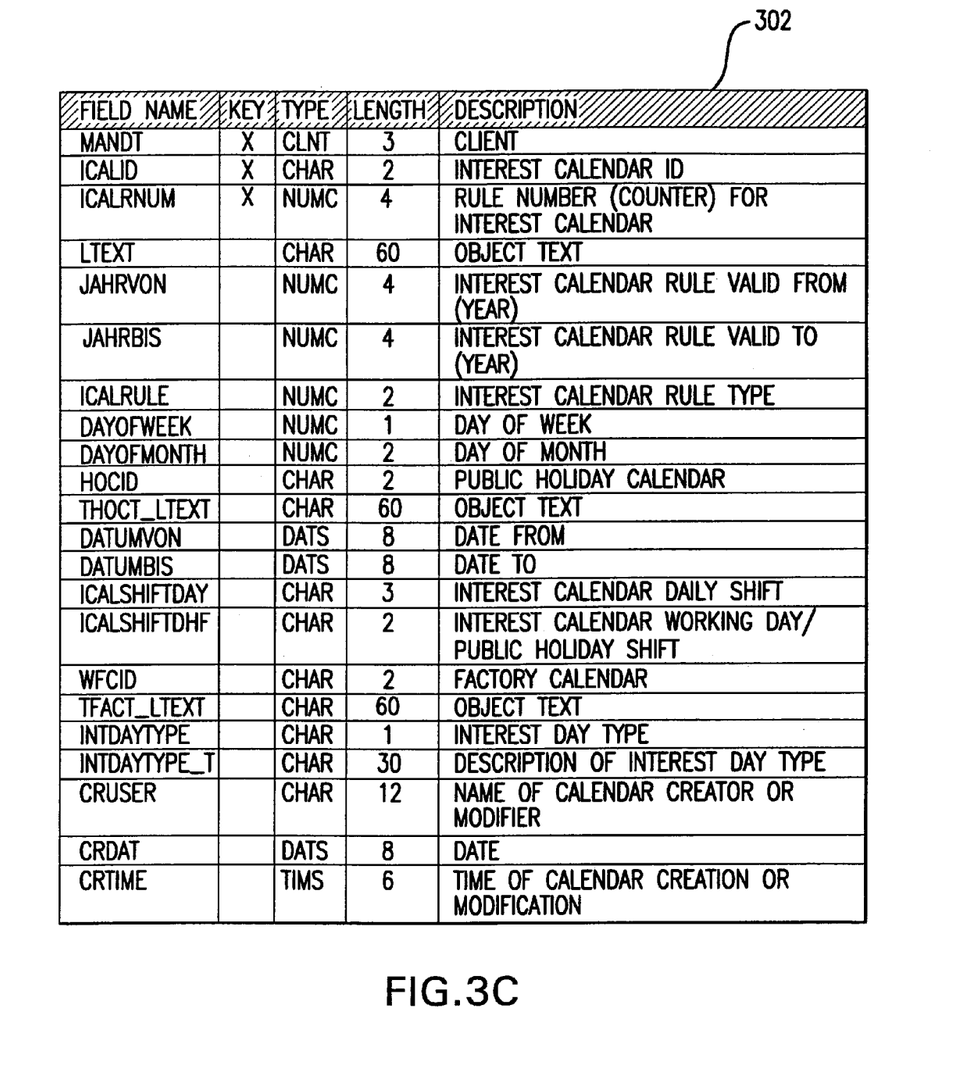

Table 302, shown in FIG. 3C, is an example of a table that may be used to assign generation rules to calendar days. Table 302 may provide for storing a generation rule number in field ICALRNUM, and a rule type in field ICALRULE. The ICALRNUM field, more specifically, may correspond to the generation rules 102 described earlier in connection with FIG. 1A, for example, which are used by the interest calendar generator to generate a particular combination of interest day types. A number or rank in a hierarchy of generation rules may be assigned to a generation rule using the ICALRNUM field, as described in more detail further on. A value for the ICALRULE field may associate a generation rule with a particular kind of calendar day, for example, a day of the week, a public holiday, etc. The generation rule number and rule type may determine what particular combination of interest day types are to be generated for a given time period.

Table 302 may further comprise an INTDAYTYPE field, a DAYOFWEEK field, a DAYOFMONTH field, and a HOCID field. These fields may have values assigned to them in a process for generating an interest calendar, as described in more detail below.

Figure 3D:
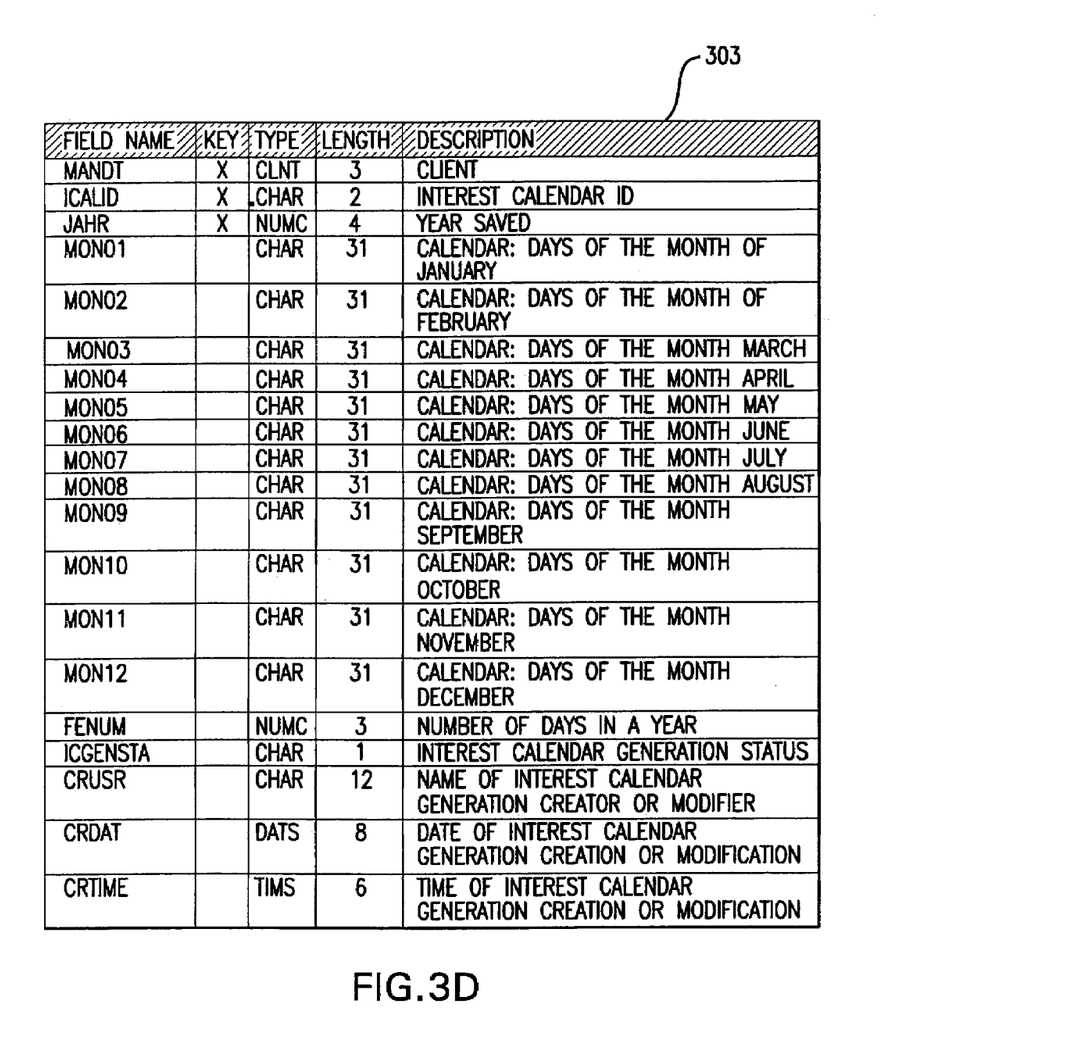

FIG. 3D shows a table 303 according to embodiments of the invention. Table 303 may correspond to an actual interest calendar 104 as discussed in connection with FIG. 1A. Table 303 may comprise a unique calendar identifier, ICALID, as discussed previously. Table 303 may further comprise fields for each month of a year, where positions in the fields are filled with combinations of interest day types as generated according to specified generation rules. For example, the MON04 field could be filled with the following character string: MON04="0111110011321001111160011115004-" (corresponding to the interest calendar 104 shown as an example in FIG. 1A), where each character represents an interest day type. For example, day 1 of MON04 has interest type "0"; day 2 of MON04 has interest type "1", and so on. These interest day types, as described earlier, could be referred to by software that calculates interest, to determine how interest should be calculated on a given day.

Figure 3E:
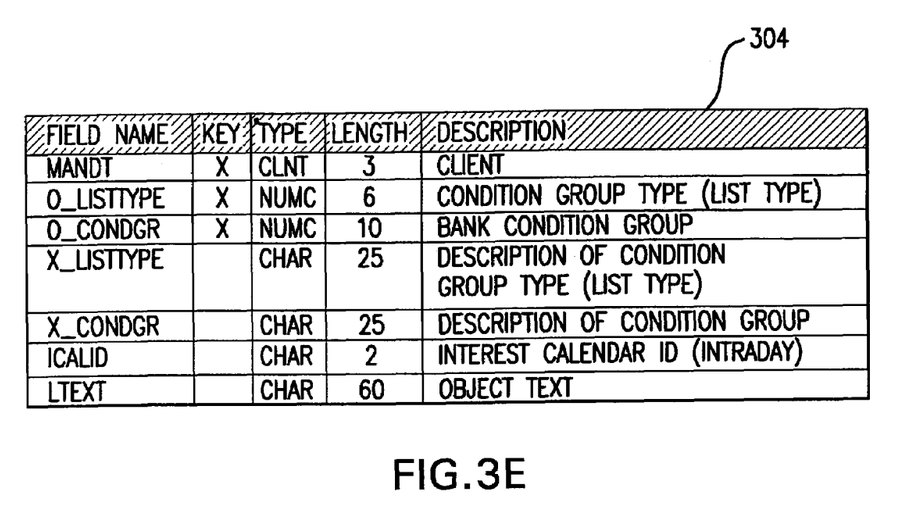

As noted above, different interest day types may be associated with respective different conditions 103. The conditions, for example, may specify a particular interest rate that is to be used on a corresponding day to calculate interest on a sum of money. Thus, to perform a given interest calculation on a given day, banking application software might, for example, consult an interest calendar 104 as shown in FIG. 1A, determine the conditions for the given day, and calculate interest on a sum of money based on the conditions. More particular, the conditions might set a particular interest rate or rates as being applicable on a given day. FIG. 3E shows a table 304 which may be used in linking conditions to a particular interest calendar. More specifically, entry of a particular value for the ICALID field (identifying a particular interest calendar), and a particular value for the O_LISTTYPE field (identifying a particular group of conditions), may create an association or linkage between the identified interest calendar and the identified group of conditions. When, for example, interest calculation software needs to determine a particular condition for a given calendar day, the interest calendar for that day may be consulted and the applicable conditions determined, based on the linkage.

As noted earlier, embodiments of the present invention may comprise a user interface able to read, add to and modify the tables described above. A user might invoke embodiments of the invention, for example, via a computer monitor and associated input device, such as a keyboard or mouse. More specifically, a user could enter values via the user interface to cause a particular interest calendar to be generated, and in response, software for implementing an interest calendar generator 100 as discussed in connection with FIG. 1A could be executed to generate the interest calendar. A process of entering user inputs and generating a corresponding interest calendar is illustrated in flowchart form in FIG. 4 and discussed below.

Figure 4:
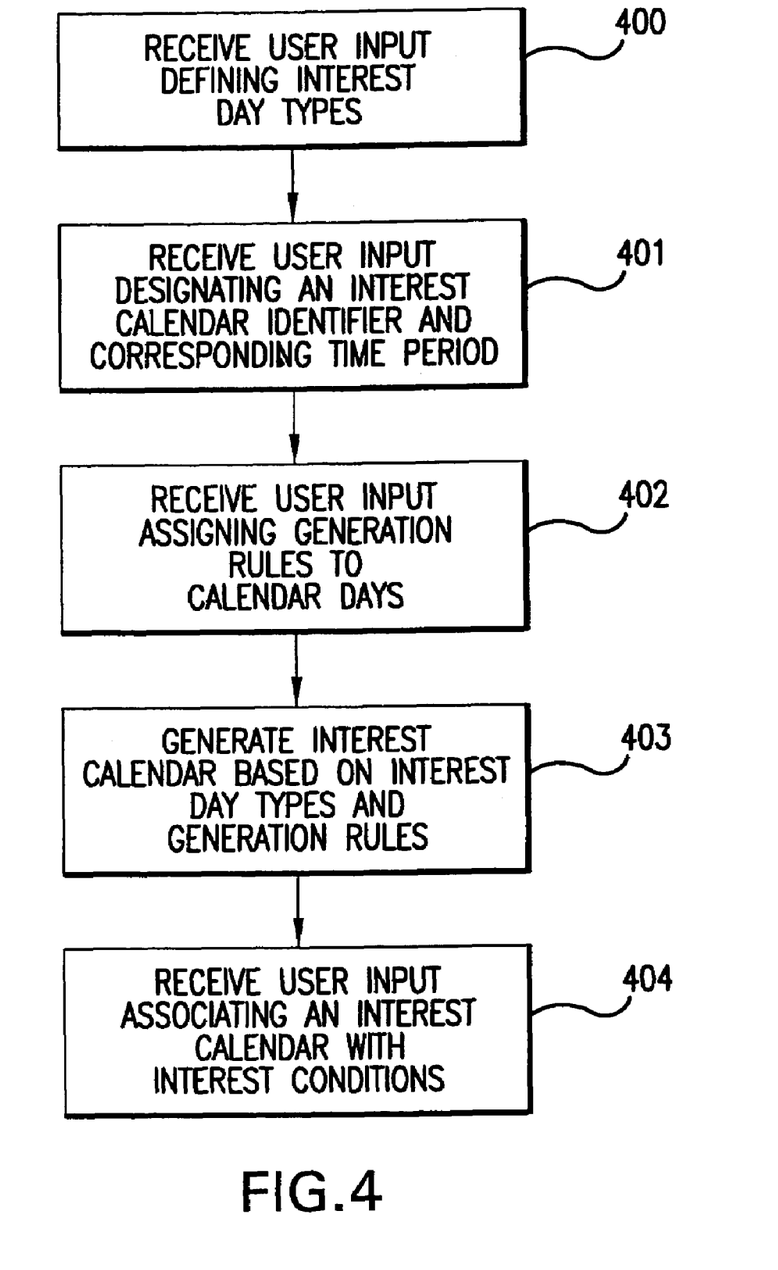
FIG. 4 shows a flowchart of a process according to embodiments of the invention.

As shown in block 400, software according to embodiments of the present invention may receive user input defining interest day types. More specifically, as a preliminary step to generating an interest calendar, a user might, for example, define interest day types. To do this, the user might call up or invoke, on a display device, a display corresponding to table 300. In a field corresponding to INTDAYTYPE, the user might enter a character, such as a numeric digit, representing an interest day type. In a field corresponding to INTDAY TYPE_T, the user might enter a description of the interest day type. Fields corresponding to COLOR, INTENS and INVERS could be used to control the appearance of the interest calendar in a display when ultimately produced. Returning to the example discussed earlier, assume interest day types 0-6 are defined as shown below in Table I:

TABLE I

0 = Weekend day
1 = Working day
2 = Public holiday
3 = Workday before public holiday
4 = Last workday of month
5 = Workday before month-end
6 = Option expiry day After defining interest day types, the user could save the definition of the interest day types on a database on a machine-readable medium.

As shown in block 401, software according to embodiments of the present invention might further receive user input designating an interest calendar identifier and corresponding time period. More specifically, to create or modify a particular interest calendar, the user might call up or invoke a display corresponding to table 301. In a field corresponding to ICALID in table 301, the user might enter an identifier, for example, a number, identifying an interest calendar to be created or modified. The user might further specify, using fields corresponding to VJAHR and BJAHR in table 301, a period of time that the interest calendar identified in the ICALID field is applicable or valid, in terms of a start year and an end year. The period of time covered by the interest calendar may subsequently be assigned various combinations of interest day types, as discussed further on. The user could save the interest calendar identifier and the associated period of time on a database on a machine-readable medium.

As shown in block 402, software according to embodiments of the present invention might further receive user input assigning generation rules to calendar days in the period of time for which an interest calendar is to be generated. A generation rule may associate an interest day type with a calendar day. Assume a plurality of generation rules are predefined and stored on a database. The generation rules might look, by way of example, as shown below in Table II:

TABLE II

| | |
|---|---|
| Generation rule no 1: | Monday has interest day type "1". |
| Generation rule no. 2: | Tuesday has interest day type "1". |
| Generation rule no. 3: | Every day before a public holiday has interest day type "3" |
| Generation rule no. 4: | Wednesday has interest day type "1". |
| Generation rule no. 5: | Thursday has interest day type "1". |
| Generation rule no. 6: | Friday has interest day type "1". |
| Generation rule no. 7: | Every third Friday in the third month of a quarter has interest day type "6". |
| Generation rule no. 8: | Saturday has interest day type "0". |
| Generation rule no. 9: | Sunday has interest day type "0". |
| Generation rule no. 10: | The last workday of the month has interest day type "4". |
| Generation rule no. 11: | Public holidays have interest day type "2". |

As shown, the generation rules (Table II) may be defined in terms of a numerical sequence. The numerical sequence may define a hierarchy of rules: that is, a rule with a higher number overrides a rule with a lower number. Thus, for example, rule 7 would override rule 6 on the third Friday in the third month of a quarter.

There may further be a plurality of pre-defined generation rule "types" stored on a database. A rule type may associate a generation rule with repeating types of calendar days (e.g., weekdays, last workday of the month). The generation rule types may appear as shown below by way of example in Table III:

TABLE III

| | |
|---|---|
| Rule type 01 - Day of the week: | a specified generation rule is to be applied to all corresponding weekdays of a "validity period" for the generation rule. |
| Rule type 02 - Day of month: | a specified generation rule is to be applied to all days having the corresponding position within a month as a whole, where the position is specified as a number between 1 and 31, for a |

TABLE III-continued

| | |
|---|---|
| | validity period corresponding to the generation rule. The value 31 may be understood to correspond to the last day of the month for months of fewer than 31 days. |
| Rule type 03 - Public holiday: | a specified generation rule is to be applied to all public holidays in a validity period for the generation rule. |
| Rule type 04 - Date interval: | a specified generation rule is to be applied to a date or dates within a specified range within a validity period for the generation rule. |
| Rule type 05 - Option expiry day: | a specified generation rule is to be applied to the third Friday in the third month of the quarter for all quarters that fall within a validity period of the generation rule. |

As noted above in connection with block 402, software according to embodiments of the present invention may receive user input assigning generation rules to calendar days. The generation rules may be applied by the interest calendar generator 100, as described further on, to assign interest day types to the calendar days. A generation rule may associate an interest day type with a calendar day. To assign generation rules to calendar days, the user might call up a display corresponding to table 302.

For example, the user might begin by assigning generation rules to days of the week (Monday through Sunday). For such an operation, the user might enter a number in a field corresponding to ICALRNUM, representing generation rule numbers. For example, the user might enter "0001", for generation rule no. 1, as described above. The user might further enter a value in the field corresponding to JAHRVON, as the start time/date of a validity period for the generation rule, and a value in the field corresponding to JAHRBIS, as the start time/date of a validity period for the generation rule. According to embodiments, the validity period designated by JAHRVON and JAHRBIS in table 302 may not precede or extend beyond the period of time designated by VJAHR and BJAHR in table 301, as described above.

The user might further enter "01" in a field corresponding to ICALRULE, representing rule type, to indicate that the generation rule corresponds to weekdays. Entry of a particular rule type might cause associated fields in the display to be enabled/disabled for data entry. For example, rule type "01" might enable entry of data in a field corresponding to DAYOFWEEK, but not in others.

After entering a rule type of "01," the user might enter "1" in a field corresponding to DAYOFWEEK, where the digits 1-7 represent Monday through Sunday, respectively. The user could then save the values entered as described above in a database on a machine-readable medium.

Similarly, the user might assign rule no. 2, above, to Tuesdays by entering "0002" in the field corresponding to ICALRNUM, and "2" in the field corresponding to DAYOFWEEK, and save these values. The user might proceed in a similar manner to assign generation rules to each working day of the week. For Saturday, the user might enter an "8" for ICALRNUM, and a "6" for DAYOFWEEK. For Sunday, the user might enter a "9" for ICALRNUM, and a "7" for DAYOFWEEK.

For interest day types that relate to a position of a day within a month as a whole, such as interest day type 4, the DAYOFMONTH field of table 302 may be used. For example, to assign a generation rule to the last day of the month, the user might enter "02" for ICALRULE, "31" for DAYOFMONTH, and "10" for ICALRNUM.

To assign generation rule no. 7 to the third Friday in the third month of a quarter, the user might enter "05" for ICALRULE and "7" for ICALRNUM. Along the above lines, the third Friday of each month may fall on a different day, so there is not a single DAYOFMONTH value that applies to all third Fridays. To assign generation rule no. 11 to public holidays within a validity period, the user might enter "03" for ICALRULE, and some value for HOCID. HOCID represents a separate calendar identifying public holidays, which may be read to determine when public holidays occur within a validity period. For each related set of values entered, the user could save the values in a database.

Fields DATUMVON and DATUMBIS might be used for generation rules of rule type 04, described above.

As shown in block 403, the user might then cause computer-executable instructions for implementing the interest calendar generator 100 to be executed, for example by entering some combination of keystrokes or clicking on a display field of the user interface 200. Such an operation may cause the values stored by processes as described above, as well as, for example, pre-existing generation rules and rule types, to be read and acted on by the interest calendar generator 100. Based on the stored values and generation rules read by the interest calendar generator 100, the interest calendar generator 100 could assign a combination of interest day types to a period of time covered by the interest calendar identified by ICALID, and write a corresponding calendar to a database.

For example, based on a generation rule number "0001" entered for ICALRNUM, values entered for JAHRVON and JAHRBIS designating a validity period of one year, rule type "01" entered for ICALRULE, and value "1" entered for DAYOFWEEK, the interest calendar generator might generate the sequence "-1------1------1------1------1-" for a month of the period designated by VJAHR and BJAHR in table 301. In the sequence, each position represents a day of the month; the dashes (-) represent unfilled or unassigned positions, and the numbers represent assignments of interest day types to corresponding days. Thus, the sequence shown indicates that a workday interest day type has been assigned to every Monday in the month.

Based on a generation rule number "0002" entered for ICALRNUM, values entered for JAHRVON and JAHRBIS designating a validity period of one year, rule type "01" entered for ICALRULE, and value "2" entered for DAYOFWEEK, the interest calendar generator might generate the sequence "-11-----11-----11-----11-----1-". Thus, a workday interest day type has been assigned to every Tuesday in the month.

Along similar lines, based on values entered for days of the week, the interest calendar generator might eventually output the sequence "0111110011111001111110011111001-". Subsequent processing of higher-ranked generation rules by the interest calendar generator might cause some of these assignments to be changed. For example, rule 7 might override rule 6, resulting in the sequence "0111110011111001111160011111001-". After all generation rules were processed for the month, the interest calendar generator might ultimately output the sequence "01111100113210011116001115004-", corresponding to the example discussed earlier. After all the generation rules for all the months covered by VJAHR and BJAHR in table 301 were processed, the resulting interest calendar might be saved to a database under the identifier assigned to it by ICALID. A corresponding table, as noted earlier, might appear as table 303. The interest calendar could be viewable on a display 200 of the user interface.

Referring now to FIG. 4 again, as shown in block 404, software according to embodiments of the present invention may receive user input associating an interest calendar with interest conditions. As noted earlier, table 304 may be used in linking conditions to a particular interest calendar. More specifically, the user might call up a display corresponding to table 304, enter values in fields corresponding to ICALID O_LISTTYPE, and save the values on a database to create an association or linkage between the interest calendar identified in ICALID and the group of conditions identified in O_LISTTYPE.

Figure 5:
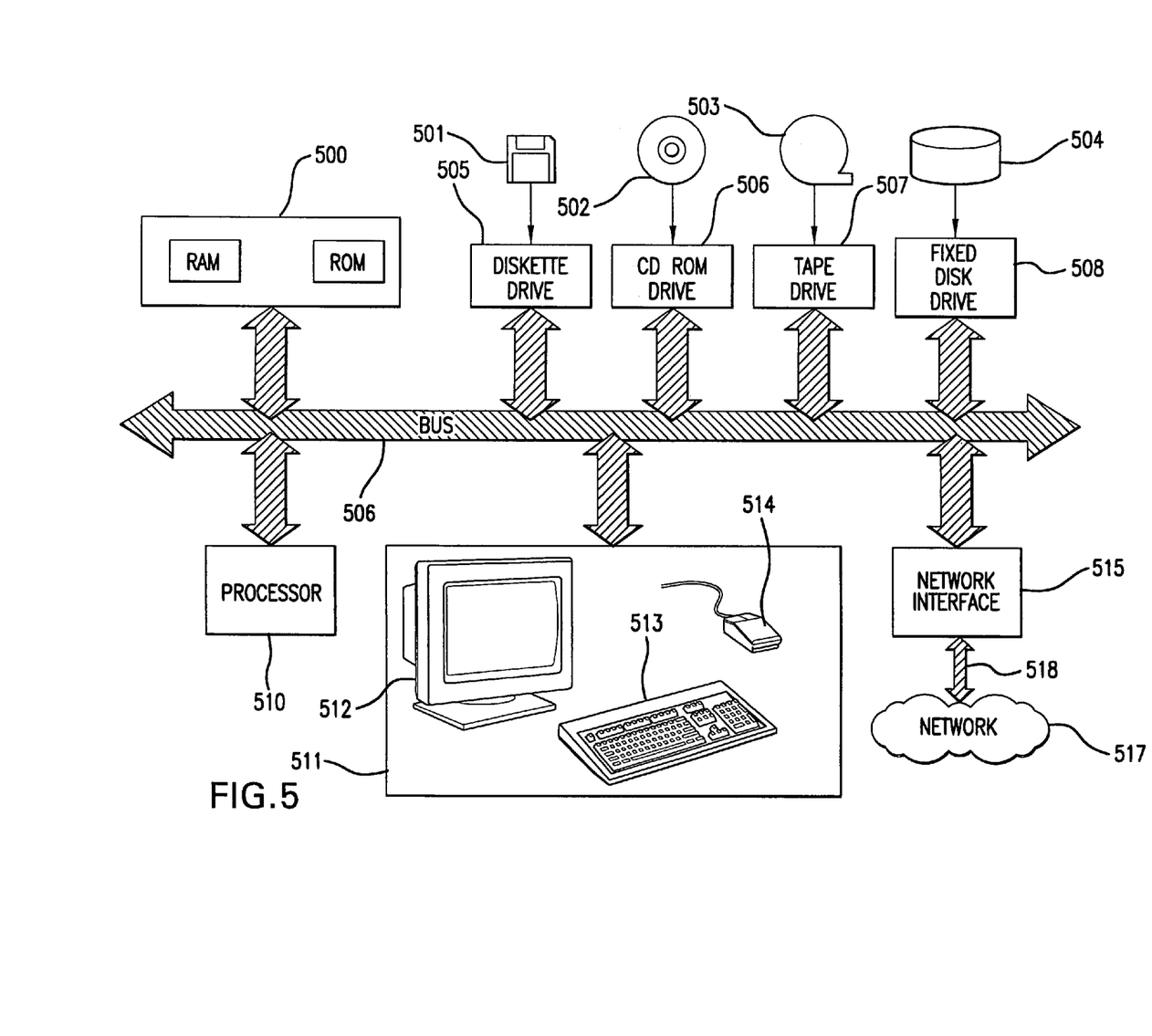
FIG. 5 shows a computer system for implementing embodiments of the invention.

FIG. 5 shows a high-level representation of a computer system for implementing embodiments of the present invention, such as might be realized by a variety of known and commercially available hardware and software elements. The system comprises a memory 500 including ROM and RAM, processor 510 and user interface 511 comprising a video display 512, keyboard 513 and mouse 514. Elements may communicate via system bus 509. The system may further comprise a network 517 connected by a network medium 518 and network interface 515.

A computer program or collection of programs comprising computer-executable instructions according to embodiments of the present invention may be stored and transported on computer-usable media such as diskette 501, CD-ROM 502, magnetic tape 503 and fixed disk 504. To perform the embodiments, computer instructions may be retrieved from the computer-usable media 501-504 using their respective drives 505-508 into memory 500, and executed by a processor 510. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method on a computing apparatus for generating an interest day calendar, comprising:

initializing an interest day calendar comprising a plurality of calendar days;

receiving, via a user interface from a user, definitions of a plurality of interest day types, the interest day types defining a category for an interest rate to be applied on a calendar day;

receiving, via the user interface from the user, definitions of a plurality of generation rules, wherein each generation rule assigns calendar days to one of the plurality of interest day types, and each generation rule has a priority, defining a hierarchy for the generation rules;

assigning, using the computing apparatus, an interest day type to each calendar day referenced by at least one of the plurality of generation rules, the interest day type corresponding to a highest priority generation rule referencing the calendar day, the assigning over-writing the initialized interest day type;

displaying the updated interest day calendar to the user; and performing an interest calculation for a specified calendar day for an account based on an interest day type assigned to the specified calendar day, wherein a set of conditions for each interest day type is used to calculate the interest for the calendar day, and wherein the set of conditions relate to current market interest rates.

2. The method of claim 1, wherein the interest day types include a workday type.

3. The method of claim 1, wherein the interest day types includes a weekend day type.

4. The method of claim 1, wherein the interest day types include a public holiday day type.

5. The method claim 1, wherein the interest day types include a financial market event day type.

6. The method of claim 1, further comprising receiving input defining a period of time that the generated calendar is to cover.

7. A machine-readable medium storing computer-executable instructions to implement a process for generating an interest day calendar, the process comprising:

initializing an interest day calendar comprising a plurality of calendar days;

receiving, via a user interface from a user, definitions of a plurality of interest day types, the interest day types defining a category for an interest rate to be applied on a calendar day;

receiving, via the user interface from the user, definitions of defining a plurality of generation rules, wherein each generation rule assigns calendar days to one of the plurality of interest day types, and each generation rule has a priority, defining a hierarchy for the generation rules;

assigning an interest day type to each calendar day referenced by at least one of the plurality of generation rules, the interest day type corresponding to a highest priority generation rule referencing the calendar day, the assigning over-writing the initialized interest day type;

displaying the updated interest day calendar to the user; and performing an interest calculation for a specified calendar day for an account based on an interest day type assigned to the specified calendar day, wherein a set of conditions for each interest day type is used to calculate the interest for the calendar day, and wherein the set of conditions relate to current market interest rates.

8. The machine-readable medium of claim 7, the process further comprising receiving input defining a period of time that the generated calendar is to cover.

9. A system comprising:

a memory storing computer-executable instructions;

a processor coupled to the memory to execute the instructions, the instructions when executed implementing a process for generating an interest day calendar, the process comprising:

initializing an interest calendar comprising a plurality of calendar days;

receiving, via a user interface from a user, definitions of a plurality of interest day types, the interest day types defining a category for an interest rate to be applied on a calendar day;

receiving, via the user interface from the user, definitions of a plurality of generation rules, wherein each generation rule assigns calendar days to one of the plurality of interest day types, and each generation rule has a priority, defining a hierarchy for the generation rules;

assigning an interest day type to each calendar day referenced by at least one of the plurality of generation rules, the interest day type corresponding to a highest priority generation rule referencing the calendar day, the assigning over-writing the initialized interest day type;

displaying the updated interest day calendar to the user; and performing an interest calculation for a specified calendar day for an account based on an interest day type assigned to the specified calendar day, wherein a set of conditions for each interest day type is used to calculate the interest for the calendar day, and wherein the set of conditions relate to current market interest rates.

10. The system of claim 9, the process further comprising receiving input defining a period of time that the generated calendar is to cover.

* * * * *